United States Patent Office 3,531,569
Patented Sept. 29, 1970

3,531,569
17α-CARBOETHYNYL-3,17β-ESTRADIOL
DERIVATIVES
Sandor Barcza, West Orange, N.J., assignor to Sandoz-Wander, Inc., Hanover, N.J., a corporation of Delaware
No Drawing. Continuation-in-part of applications Ser. No. 707,991, Feb. 26, 1968, and Ser. No. 737,339, June 17, 1968. This application Jan. 6, 1969, Ser. No. 789,405
Int. Cl. A61k 17/06
U.S. Cl. 424—241                16 Claims

ABSTRACT OF THE DISCLOSURE

Derivatives of 17α-carboxyethynyl-3,17β-estradiols, e.g., the 3-methyl ether of 17α-carbomethoxyethynyl-3,17β-estradiol are useful pharmaceutically, and are obtainable from estrone or analogs thereof.

---

This is a continuation-in-part of my copending applications Ser. No. 707,991 filed Feb. 26, 1968, and Ser. No. 737,339 filed June 17, 1968 both now abandoned.

This invention relates to steroid compounds and more particularly to 17α-carbo(lower alkoxy)ethynyl - 3,17β-estradiol derivatives and to therapeutic compositions containing such compounds and to the use thereof, as well as to the preparation of such compounds and to intermediates in such preparation.

The compounds of this invention are derivatives of estradoil and may be represented structurally by the Formula I:

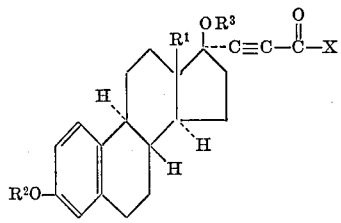

(I)

wherein

R¹ is alkyl having 1 to 3 carbon atoms, e.g., methyl, ethyl or propyl;
R² is a hydrogen atom; lower alkyl, e.g., having from 1 to 4 carbon atoms such as methyl, ethyl, propyl or butyl; cycloalkyl having from 5 to 6 carbon atoms, i.e. cyclopentyl or cyclohexyl; lower alkanoyl, e.g., having from 2 to 4 carbon atoms, such as acetyl, propionyl, or butyryl; or benzoyl;
R³ is a hydrogen atom; lower alkanoyl, e.g., having from 2 to 4 carbon atoms, such as acetyl, propionyl or butyryl; or benzoyl; and
X is either lower alkoxy, e.g., having from 1 to 4 carbon atoms, such as methoxy, ethoxy, propoxy, or butoxy; or 1-cycloamino having the structure:

—N(CH₂)ₙ wherein n is a whole integer of from 4 to 5, i.e. pyrrolidino or piperidino;

provided that when X is 1-cycloamino then R² is either a hydrogen atom or lower alkyl and R³ is a hydrogen atom, and further provided that R² is not a hydrogen atom when R³ is other than a hydrogen atom.

Compounds I include three classes of compounds, which may be represented structurally below wherein R¹ is as defined above:

Ia, a 3-hydroxy, or 3-hydrocarbon ether ester:

wherein alk is lower alkyl, e.g., having from 1 to 4 carbon atoms such as methyl, ethyl, propyl or butyl; and
R⁴ is a hydrogen atom, lower alkyl, e.g., having from 1 to 4 carbon atoms, such as methyl, ethyl, propyl or butyl, or cycloalkyl having from 5 to 6 carbon atoms, i.e. cyclopentyl or cyclohexyl;

Ib, an acylated ester:

wherein alk is as defined above;
R⁵ is lower alkyl, e.g., having from 1 to 4 carbon atoms, such as methyl, ethyl, propyl or butyl; cycloalkyl having from 5 to 6 carbon atoms, i.e. cyclopentyl or cyclohexyl; lower alkanoyl, e.g., having from 2 to 4 carbon atoms, such as acetyl, propionyl or butyryl; or benzoyl; and
R⁶ is a hydrogen atom, lower alkanoyl, e.g., having from 2 to 4 carbon atoms, such as acetyl, propionyl or butyryl, or benzoyl; and Ic, an amide:

wherein R¹ and n are as defined above, and R⁷ is a hydrogen atom or lower alkyl, e.g., having from 1 to 4 carbon atoms, such as methyl, ethyl, propyl and butyl.

Compounds Ia may be obtained by a process involving reacting an organo metallic compound having a —C≡CCOOalk moiety, i.e. a compound III, with an estrone, or 3-lower alkyl or cycloalkyl ether thereof, which may be substituted or unsubstituted at the 18-position, the substituents being methyl, dimethyl or ethyl, i.e. a compound II, to form the corresponding metallic salt of the resultant lower alkyl ester of a 17α-carboxyethynyl-3,17β-estradiol or ether thereof, which salt is then hydrolyzed to its corresponding compound Ia.

The above-described method for the preparation of compounds Ia is conveniently illustrated by the reaction scheme, below, wherein R¹, R⁴ and alk are as defined above, and M is a metallo function, e.g., Mg/2 or an alkali metal, such as lithium, sodium or potassium, preferably lithium.

REACTION SCHEME

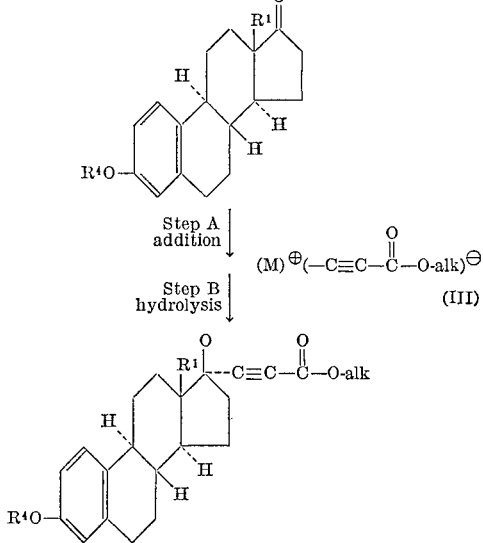

Referring to the reaction scheme above, the addition reaction (step A) of an appropriate organo metallic compound (III) with an appropriate compound II is carried out in conventional manner for the alkylation of a carbonyl-containing compound by means of an organo metallic reagent. For example, by intimately admixing a compound III and a compound II under anhydrous conditions in a medium which would be suitable for carrying out a Grignard reaction, e.g., tetrahydrofuran or diethyl ether, at reduced temperatures, e.g., from −78° to −45° C., then allowing the reaction mixture to warm, e.g., up to about 0° C. Preferred ratios of compounds III to II are from 5 to 15:1.

The hydrolysis of the salt of the resultant compound Ia, i.e. step B is carried out in the conventional manner for the liberation of an alcohol from its alcoholate salt, e.g., by acidification of the salt, preferably by dropwise addition of glacial acetic acid to the salt, in solution with cooling.

Compounds Ia, wherein R⁴ is lower alkyl or cycloalkyl, i.e. compounds Ia′ are also obtainable by esterification under relatively mild conditions, by means known per se, of an appropriate 3-hydrocarbon ether of an 18-substituted or -unsubstituted-17α-carboxyethynyl-3,17β-estradiol; the substituents being methyl, dimethyl or ethyl (the 18-position being the carbon atom of the methyl function at the 13-position of the nucleus), i.e. a compound IV.

Suitable procedures for the esterification of a compound IV to a compound Ia′, include contacting a compound IV with a diazo(lower) alkane, e.g., diazomethane, preferably in slight molar excess, in an appropriate solvent, e.g., tetrahydrofuran and at from about 0° to 30° C.

In preparing a compound Ia wherein R⁴ is a hydrogen atom, i.e. a compound Ia°, it is preferred to protectively mask the 3-hydroxy function of the appropriate compound II during step A. The protective masking may be accomplished in a conventional manner, e.g., by converting the 3-hydroxy function of the appropriate compound II to a 3-(2′-tetrahydropyranyl) ether, i.e., to a compound V, then reacting said ether (V) and then cleaving the resultant ether to the corresponding 3-hydroxy-containing compound Ia°. Thus, step A may be carried out on said tetrahydropyranyl ether (V) to form the salt of the resultant ether of compound Ia°, then hydrolyzing the salt (step B) under conditions which also cleave the tetrahydropyranyl ether moiety, e.g., by incorporating water into the acidifying agent used in step B and allowing the acidified mixture formed in step B to stand, e.g., at from about 0° to 40° C. for at least ½ hour, preferably at from about 15° to 30° C. for from about 8 to 24 hours.

The starting materials for the preparation of compounds Ia, i.e. compounds II, III and IV are either known and can be prepared as described in the literature or they can be prepared from available materials in analogous manner to that described in the literature for the preparation of known compounds. For example, the methyl ether of 17α-carboxyethynyl-3,17β-estradiol and its preparation are described in U.S. Pat. 2,875,199 of John A. Cella, issued Feb. 24, 1959. Exemplary of the preparation of a compound III is the reaction of n-butyl lithium with methyl propiolate in an appropriate medium, i.e. a medium used in forming Grignard reagents, such as tetrahydrofuran, at from −80° to −50° C. under anhydrous conditions, to obtain (Li) (—C≡C—COOCH₃).

Compounds Ib may be obtained by acylating an appropriate compound Ia (step C).

The acylation of a compound Ia may be effected in conventional manner. It will be noted that, in the compounds of Formula Ia°, the hydroxyl group at the 3-position is phenolic, and that at the 17β-position is tertiary. As one skilled in the art will be aware, the ease of acylation is phenolic>tertiary and the ease of resaponification is clearly phenolic>tertiary; hence, when acylating a compound having hydroxyl groups at both the 3- and 17β-positions, the 3-acyl derivative is preferentially formed. Accordingly, acylating agents and the stringency of acylating conditions can be chosen depending on the degree of acylating conditions can be chosen depending on the degree of acylation required. Suitable acylating agents include acids, acyl halides and acid anhydrides of formulae ACOOH, ACOOHal and (ACO)₂O, respectively, wherein A signifies an alkyl group of 1 to 3 carbon atoms or phenyl and Hal signifies bromine or chlorine, and mixtures thereof. When the desired acyl moiety is acetyl, a preferred acylating agent is acetic anhydride. In carrying out the acylation, inert solvent may be employed or excess acylating agent may serve as solvent. An acid-binding agent, e.g., pyridine, is preferably used. Preferred temperatures vary between −10 and 50° C. The considerations involved are well within the scope of a person skilled in the art.

Compounds Ic, i.e. compounds I wherein X is 1-cycloamino are obtainable by amination of a suitable compound Ia by conventional means for converting an organic ester to a corresponding amide, e.g., by contacting an appropriate compound Ia with a compound VI, i.e. a compound for the formula (VI) 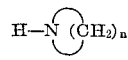

wherein n is as defined above, preferably in an inert organic solvent, e.g., tetrahydrofuran; however, compound VI may be used in excess to serve as solvent. Suitable compounds VI include pyrrolidine and piperidine. The reaction is preferably carried out under anhydrous conditions and at temperatures of from −10° to +50° C., preferably at 0° to +25° C.

The compounds I are useful because they possess pharmacological activity in animals. In particular, compounds Ia°, Ib and Ic are useful as estrogenic agents, as indicated by observing increase in white mouse uterine weight as described in Endocrinology, 65, 265 (1959);

while compounds Ia', e.g., 3-methyl ether of 17α-carbomethoxyethynyl-3,17β-estradiol, are useful as ovulation inhibiting agents in mammals, such as primates, and for the treatment of menstrual dysfunction in higher primates as the compounds exhibit combined estrogenic and progestational activity; the estrogenic activity is indicated as described above and the progestational activity is indicated by the Clauberg method in the white rabbit as described in Endocrinology, 63, 464 (1958).

These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds Ia' are administered at a daily dosage of from about 1 milligram to 10 milligrams, and when compounds Ia°, Ib and Ic are administered at a daily dosage of from about 0.1 milligram to 30 milligrams. Such daily dosage is preferably given in equally divided doses, e.g., 1 to 2 times a day, or in sustained release form, independent of body weight. Dosage forms suitable for internal administration comprise from about 0.05 milligram to about 30 milligrams of the compound in admixture with a solid or liquid pharmaceutical carrier or diluent.

A representative formulation suitable for oral administration is a tablet prepared by standard tabletting techniques which contains the following.

| Ingredient: | Parts by weight |
| --- | --- |
| 3-methyl ether of 17α-carbomethoxyethynyl-3,17β-estradiol | 0.5 |
| Tragacanth | 2 |
| Lactose | 89 |
| Corn starch | 5 |
| Talcum | 3 |
| Magnesium stearate | 0.5 |

The following examples are presented as illustrative of the invention; all temperatures being centigrade unless indicated otherwise.

EXAMPLE 1

3-methyl ether of 17α-carbomethoxyethynyl-3,17β-estradiol

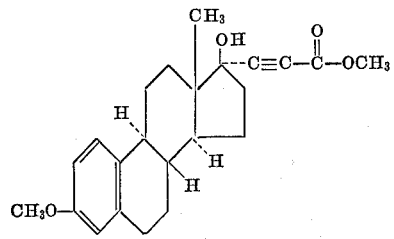

The air in a reaction vessel is replaced by nitrogen. 100 ml. of absolute tetrahydrofuran is added. The vessel is cooled by an external Dry Ice bath (−78°). A 1.6 molar n-butyl lithium solution (200 mmoles) in 125 ml. of hexane is added dropwise with stirring. A solution of 16.8 g. (200 mmoles) of methyl propiolate in 50 ml. of absolute tetrahydrofuran is added dropwise over an approx. 10-minute period with stirring; the temperature of the mixture being maintained at from −78 to −50°. The temperature is allowed to rise to between about −55 and −50° for 10 minutes. Through an opening where outward nitrogen flow is maintained, 5.68 g. (20 mmoles) of powdered estrone methyl ether is added to the stirred mixture. Stirring is continued while the bath temperature is allowed to rise over a period of 3 hours to 0°. The mixture is then cooled with an ice bath and stirred for 1 hour, then 20 ml. of glacial acetic acid is dropwise added with continued cooling. The reaction mixture is then promptly concentrated by removing most of the volatile constituents in vacuo on a bath at 40°. The concentrate (a thick oil) is taken up in 200 ml. of benzene and is extracted with 300 ml. of water containing 10 g. sodium bicarbonate. The organic layer is recovered and dried with anhydrous magnesium sulfate, filtered, the cake washed with more benzene and the combined filtrate benzene wash concentrated by removing solvent in vacuo. The concentrate is dissolved in 500 ml. of benzene and applied to a column of 125 g. of silica gel. The column is first eluted with 250 ml. of benzene and then with a 600 ml. portion of benzene. The second benzene portion is evaporated to yield crude 3-methyl ether of 17α-carbomethoxyethynyl-3,17β-estradiol which is then crystallized from 100 ml. of heptane; M.P. (132) 136–137°. The product may be further refined by two recrystallizations from ether; M.P. (139) 139.5–140°.

EXAMPLE 2

3-methyl ether of 17α-carbomethoxyethynyl-3,17β-estradiol (alternative)

A solution of 100 mg. of 3-methyl ether of 17α-carboxyethynyl-3,17β-estradiol is prepared in 5 ml. of tetrahydrofuran. With stirring 2 ml. of 0.3 molar ethereal solution of diazomethane is added. Stirring is continued for 5 minutes, after which period the excess diazomethane is consumed by adding a few drops of acetic acid (indicated by the loss of the yellow color). The solution is concentrated to a glassy residue in vacuo. The residue is taken up in 10 ml. of boiling heptane. On slow cooling and after filtration the 3-methyl ether of 17α-carbomethoxyethynyl-3,17β-estradiol is obtained as white crystals; M.P. (135) 137–138°.

EXAMPLE 3

17α-carbomethoxyethynyl-3,17β-estradiol

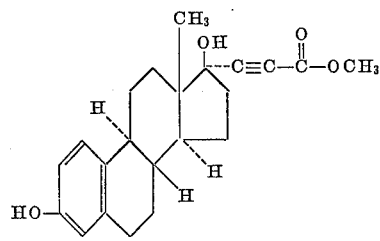

The procedure described in Example 1 is followed except that an equivalent amount of the 3-tetrahydropyranyl ether of estrone is used in place of the estrone methyl ether, and the solution of product, i.e. 3-(2'-tetrahydropyranyl)ether of 17α-carbomethoxyethynyl-3,17β-estradiol, recovered from the silica gel column is concentrated, under vacuum, the concentrate is admixed with 100 fold volume of a solution of water-glacial acetic aicd-methanol (v./v. ratio of 1:1:10). The resultant mixture is stirred at 25° for 18 hours then concentrated under vacuum to obtain a residue. The residue is crystallized from benzene to obtain 17α-carbomethoxyethynyl-3,17β-estradiol; M.P. 164–166°.

EXAMPLE 4

17α-carbomethoxyethynyl-3,17β-estradiol (alternate method)

Following the procedure described in Example 3, except that prior to treatment with silica gel, the acidified reaction mixture is stirred at 25° C. for 18 hours (to accomplish cleavage of the tetrahydropyranyl protecting group), then concentrated under vacuum, and the concentrate treated with silica gel and the product recrystallized, as described in Example 3, except a 2500 ml. portion of benzene is used to wash the crude title compound off the silica gel in place of the 600 ml. portion of benzene, title compound is obtained.

EXAMPLE 5

17α-carbomethoxyethynyl-3,17β-estradiol (alternate method)

Following the procedure described in Example 1 but using an equivalent amount of estrone (unprotected) in place of the estrone methyl ether, crude title compound is obtained as eluate, which on two crystallizations from benzene has a melting point of (154) 156–159°, which melting point is not depressed by addition of 17α-carbomethoxyethynyl-3,17β-estradiol obtained by the process of Example 3.

EXAMPLE 6

3,17β-dibenzoate of 17α-carbomethoxyethynyl-3,17β-estradiol

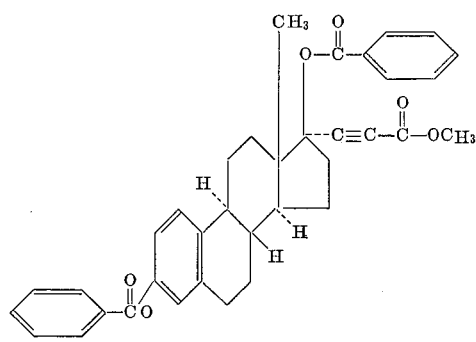

0.93 g. of 17α-carbomethoxyethynyl-3,17β-estradiol is dissolved in 20 ml. of pyridine. 2.3 ml. of benzoyl chloride is added to the solution dropwise with stirring and ice bath cooling. The mixture is allowed to stand at room temperature (25° C.) under nitrogen for four days. The reaction mixture is then cooled to 0°, and 2.5 ml. of water is added dropwise with stirring. Stirring is continued for 5 minutes at 0° and for 1 hour at room temperature (25° C.). Benzene is added and the solution is extracted with water, then 15 ml. saturated aqueous sodium bicarbonate solution, with three portions of dilute hydrochloric acid (5%) then, two portions of saturated aqueous sodium bicarbonate. The benzene solution is then dried with magnesium sulfate and concentrated to obtain a foam. Upon stirring the foam with approx. 10 ml. of ethanol a suspension is formed. Solid title compound is recovered by filtering the suspension. For an analytical sample the product is recrystallized sequentially from ethanol, then ether-ethanol (1:2) and then chloroform-ethanol (1:10), M.P.: (184) 188–190°. α_D: (+)15.60°.

EXAMPLE 7

17β-acetate of 3-methyl ether of 17α-carbomethoxyethynyl-3,17β-estradiol

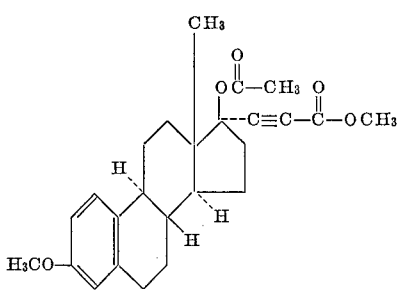

A solution of 0.9 g. of 3-methyl ether of 17α-carbomethoxyethynyl-3,17β-estradiol in 20 ml. of acetic anhydride and 20 ml. of pyridine is stored for two weeks at room temperature. 50 ml. of methanol is added with cooling (ice bath), and after standing at room temperature for 30 minutes, the mixture is concentrated in vacuo to dryness. The residue is recrystallized twice from 50 ml. ethanol-water (95:5) to yield the title compound as white crystalline material of M.P. 133–135°. Analytically pure material can be obtained by another crystallization from ethyl acetate, M.P. 133–135°. α_D: (−)28.1°, in chloroform.

EXAMPLE 8

3,17β-diacetate of 17α-carbomethoxyethynyl-3,17β-estradiol

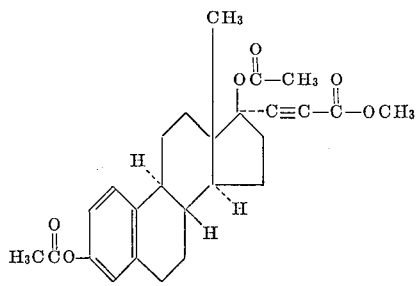

3,17β-diacetate of 17α-carbomethoxyethynyl-3,17β-estradiol is prepared by the procedure as described in Example 7 (for the 3-methyl ether analogue). The crude concentrate is crystallized with ether (10 ml.); crystals of M.P. (128) 130–133° are obtained. An analytical sample is made by recrystallizing the crystalline material twice from isopropanol, M.P. (133) 134–134.5°. α_D: (−)24.2°.

EXAMPLE 9

3-acetate of 17α-carbomethoxyethynyl-3,17β-estradiol

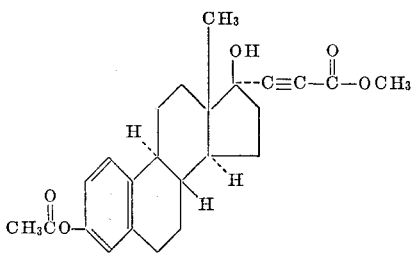

A mixture of 1.5 g. of 17α-carbomethoxyethynyl-3,17β-estradiol, 40 ml. of pyridine and 40 ml. of acetic anhydride is homogenized and allowed to stand at 25° C. for 5 hours. With cooling (ice bath) and stirring 50 ml. of methanol is added, and after a ½ hour of standing, the solution is concentrated to dryness in vacuo to furnish crude crystals. These are recrystallized from carbon tetrachloride to give 17α-carbomethoxyethynyl-3,17β-estradiol-3-acetate, M.P. (140) 140.5–141°. An analytical sample can be prepared by another crystallization from benzene: same M.P. α_D: (−)16.2° in chloroform.

EXAMPLE 10

17α-(1′-pyrrolidinylcarbonyl-ethynyl)-3,17β-estradiol

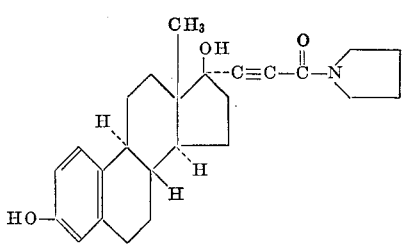

A solution of 1.5 g. of 17α-carbomethoxyethynyl-3,17β-estradiol in 60 ml. of absolute tetrahydrofuran and 30 ml. of pyrrolidine is allowed to stand under nitrogen for 2 hours at 0° and for 3 hours at room temperature. The mixture is evaporated in vacuo to obtain a foam, which is crystallized by the addition of ether to give the title compound; M.P. dec. (240) 258–270° (dependent on the rate of heating). Higher purity product is obtainable by recrystallizing from methanol:tetrahydrofuran (1:1), M.P. dec. 280–283°.

EXAMPLE 11

3-methyl ether of 17α-(1'-pyrrolidinylcarbonyl-ethynyl)-3,17β-estradiol

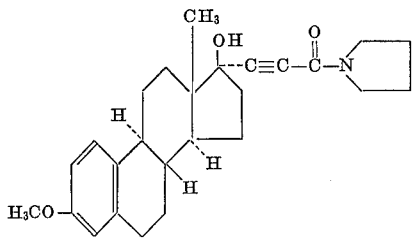

3-methyl ether of 17α-(1'-pyrrolidinylcarbonyl - ethynyl)-3,17β-estradiol is prepared by the procedure described in Example 10 but an equivalent amount of the 3-methyl ether of 17α-carbomethoxyethynyl-3, 17β- estradiol is used in place of the 17α-carbomethoxyethynyl-3, 17β-estradiol. The product is first crystallized from ether and then two more recrystallizations from isopropanol and one from ethyl acetate with charcoal treatment; M.P. 188–190°. α$_D$: (−)14.3° in chloroform.

What is claimed is:

1. A compound of the formula

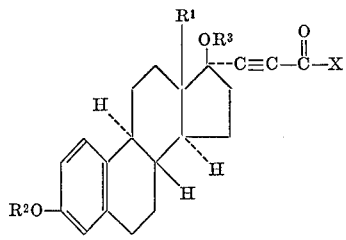

wherein $R^1$ is alkyl having from 1 to 3 carbon atoms;
$R^2$ is a hydrogen atom, lower alkyl, lower alkanoyl or benzoyl;
$R^3$ is a hydrogen atom, lower alkanoyl or benzoyl; and
X is either lower alkoxy or 1-cycloamino having the formula

wherein $n$ is a whole integer of from 4 to 5;
provided that when X is 1-cycloamino then $R^2$ is either a hydrogen atom or lower alkyl and $R^3$ is a hydrogen atom and further provided that $R_2$ is not a hydrogen atom when $R^3$ is other than a hydrogen atom.

2. A compound of claim 1 wherein X is lower alkoxy.

3. A compound of claim 2 wherein $R^2$ is a hydrogen atom, or lower alkyl.

4. The compound of claim 3 which is 3-methyl ether of 17α-carbomethoxyethynyl-3,17β-estradiol.

5. The compound of claim 3 which is 17α-carbomethoxyethynyl-3,17β-estradiol.

6. A compound of claim 2 wherein $R^2$ is lower alkanoyl or benzoyl.

7. The compound of claim 6 which is 3,17β-dibenzoate of 17α-carbomethoxyethynyl-3,17β-estradiol.

8. The compound of claim 6 which is 17β-acetate of 3-methyl ether of 17α-carbomethoxyethynyl-3,17β-estradiol.

9. The compound of claim 6 which is 3,17β-diacetate of 17α-carbomethoxyethynyl-3,17β-estradiol.

10. The compound of claim 6 which is 3-acetate of 17α-carbomethoxyethynyl-3,17β-estradiol.

11. A compound of claim 1 wherein X is 1-cycloamino.

12. The compound of claim 11 which is 17α-(1'-pyrrolidinylcarbonyl-ethynyl)-3,17β-estradiol.

13. The compound of claim 11 which is 3-methyl ether of 17α-(1'-pyrrolidinylcarbonyl-ethylnyl)-3,17β-estradiol.

14. A compound of the formula

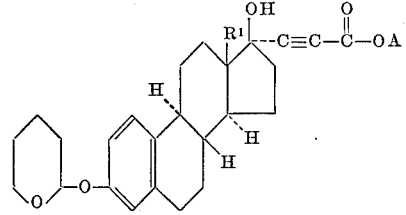

wherein $R^1$ is alkyl having from 1 to 3 carbon atoms; and
A is lower alkyl.

15. The compound of claim 14 which is 3-(2'-tetrahydropyranyl) ether of 17α-carbomethoxyethynyl-3,17β-estradiol.

16. A composition comprising an effective amount of a compound of claim 1, as active ingredient thereof, and a pharmaceutically acceptable carrier.

References Cited

UNITED STATES PATENTS

| | | | |
|---|---|---|---|
| 2,267,257 | 12/1941 | Ruzicka | 260—397.5 |
| 2,875,199 | 2/1959 | Cella | 260—239.57 |

HENRY A. FRENCH, Primary Examiner

U.S. Cl. X.R.

260—239.5, 239.55, 397.1